United States Patent
Oh et al.

(10) Patent No.: US 9,792,132 B2
(45) Date of Patent: Oct. 17, 2017

(54) CODE GENERATOR AND METHOD FOR GENERATING EXTRA CODE FOR A VIRTUAL MACHINE

(75) Inventors: Hyeong-Seok Oh, Seoul (KR); Hyung-Kyu Choi, Seoul (KR); Dong-Heon Jung, Gyeongsan-si (KR); Soo-Mook Moon, Seoul (KR); Kue-Hwan Sihn, Hwaseong-si (KR)

(73) Assignees: Samsung Electronics Co., Ltd., Suwon-si (KR); SNU R&DB FOUNDATION, Seoul (KR)

( * ) Notice: Subject to any disclaimer, the term of this patent is extended or adjusted under 35 U.S.C. 154(b) by 1007 days.

(21) Appl. No.: 13/271,465

(22) Filed: Oct. 12, 2011

(65) Prior Publication Data
US 2012/0185833 A1    Jul. 19, 2012

(30) Foreign Application Priority Data
Jan. 18, 2011   (KR) .................. 10-2011-0005144

(51) Int. Cl.
*G06F 9/45* (2006.01)
*G06F 9/455* (2006.01)

(52) U.S. Cl.
CPC ............ *G06F 9/4552* (2013.01); *G06F 8/443* (2013.01); *G06F 8/40* (2013.01)

(58) Field of Classification Search
CPC ................. G06F 9/45; G06F 8/40; G06F 8/70
USPC ............................................................ 717/139
See application file for complete search history.

(56) References Cited

U.S. PATENT DOCUMENTS

| | | | |
|---|---|---|---|
| 6,170,083 B1 * | 1/2001 | Adl-Tabatabai | 717/158 |
| 6,317,872 B1 * | 11/2001 | Gee et al. | 717/152 |
| 7,210,127 B1 * | 4/2007 | Rangachari | 717/128 |
| 2002/0053072 A1 * | 5/2002 | Steinbusch et al. | 717/148 |
| 2002/0147969 A1 * | 10/2002 | Lethin et al. | 717/138 |
| 2009/0144528 A1 * | 6/2009 | Asai et al. | 712/229 |

FOREIGN PATENT DOCUMENTS

EP           1360584 A1 * 11/2003

* cited by examiner

*Primary Examiner* — Wei Zhen
*Assistant Examiner* — Brahim Bourzik
(74) *Attorney, Agent, or Firm* — NSIP Law (57) ABSTRACT

In a virtual machine that uses a just-in-time complier (JITC) as a software execution environment, an idle time of a core to which the JITC is allocated is utilized to generate machine code in advance, thereby reducing a load on an interpreter. Accordingly, code execution performance of the interpreter is improved, and the utilization of a multi-core system that executes applications is increased.

14 Claims, 5 Drawing Sheets

CODE GENERATOR AND METHOD FOR GENERATING EXTRA CODE FOR A VIRTUAL MACHINE

CROSS-REFERENCE TO RELATED APPLICATION(S)

This application claims the benefit under 35 U.S.C. §119 (a) of Korean Patent Application No. 10-2011-0005144, filed on Jan. 18, 2011, in the Korean Intellectual Property Office, the entire disclosure of which is incorporated herein by reference for all purposes.

BACKGROUND

1. Field

The following description relates to a virtual machine that uses a just-in-time compiler as a software execution environment.

2. Description of the Related Art

A virtual machine that may be used to run an application in a device that is equipped with heterogeneous central processing units (CPUs) and memories.

Code that is written in a high-level language may be distributed, for example, as a script or as hardware-independent intermediate code. The code may be executed by the interpreters or the machine language translators of virtual machines that are installed in various devices.

Examples of a virtual machine include a JAVA® virtual machine, which is widely used in mobile phones, digital TVs and the like. Other examples include a JAVASCRIPT® that is code that may be transmitted via the web, a DALVIK® virtual machine, and the like.

Various applications may be executed in various embedded devices such as mobile phones, digital TVs, servers, desktops, and the like, using virtual machines. Bytecode is generally distributed as execution code for a virtual machine to be run in diverse execution environments. The distributed bytecode may be executed by an interpreter. However, in executing bytecode, the interpreter is slower than when executing machine code. To prevent such a drawback and increase execution speed, a just-in-time compiler (JITC) may be utilized.

For example, the JITC may compile currently executed bytecode into machine code, store the machine code in a code cache of a virtual machine, and utilize the stored machine code while executing the compiled bytecode. The JITC may track a path from a certain position of bytecode in the course of running virtual machine, and generate machine code that corresponds to a predefined length of a bytecode trace.

The bytecode trace may be a segment of code of a predefined length of bytecode. The bytecode trace may prevent consumption of a large amount of time or the generation of an excessive amount of machine codes in the JITC.

A bytecode trace may be a target to be compiled by the interpreter for executing the bytecode. In this example, if an interpreter and the JITC are running as individual threads on different cores in a multi-core system, the JITC may not execute an operation until the bytecode trace is found by tracking a path and is compiled by the interpreter. Accordingly, a core allocated to the JITC may be left in an idle state.

SUMMARY

In one general aspect, there is provided an apparatus for generating code for a virtual machine, the apparatus including an information collecting unit configured to collect tracking information that indicates a logical flow by which bytecode is to be executed, and a code determining unit configured to determine a bytecode trace which is to be compiled into machine code based on the collected tracking information, while the bytecode is not being compiled.

The apparatus may further comprise a compiler configured to compile the bytecode trace determined by the code determining unit into machine code.

The compiler may run on a core that is different from a core on which the interpreter that executes the bytecode runs.

The information collecting unit may be further configured to search a path of the bytecode that is currently being executed by the interpreter and to collect the tracking information based on the searched path.

The tracking information may include the number of executions of the bytecode by the interpreter.

The code determining unit may be further configured to define a starting point as a line of bytecode which is executed more times than a threshold value by the interpreter, and to determine the bytecode trace as a segment code from the starting point to a predefined length.

The interpreter that executes the bytecode and the code determining unit may run on different cores, and the code determining unit may be configured to determine the bytecode trace while the compiler is in an idle state.

The apparatus may further comprise a code cache configured to store machine code that is compiled from the bytecode trace determined by the interpreter or the bytecode trace determined by the code determining unit.

In another aspect, there is provided a method of generating code for a virtual machine, the method including collecting tracking information which indicates a logical flow by which bytecode is to be executed, checking whether the bytecode is being compiled, and if the bytecode is not being compiled, determining a bytecode trace to be compiled into machine code based on the collected tracking information.

The method may further comprise compiling the determined bytecode trace into machine code.

The collecting of the tracking information may comprise searching a path of the bytecode that is currently being executed by the interpreter and collecting the tracking information based on the searched path.

The tracking information may include the number of executions of the bytecode by the interpreter.

The determining of the bytecode trace may comprise defining a starting point as a line of bytecode that is executed more times than a threshold value by the interpreter, and determining the bytecode trace as a segment of code from the starting point to a predefined length.

In another aspect, there is provided a method of generating code for a virtual machine, the method including checking whether a bytecode trace determined by an interpreter is present or not, if the bytecode trace determined by the interpreter is not present, defining a starting point as a line of bytecode which is executed more times than a threshold value by the interpreter, and determining a bytecode trace as a segment of code from the starting point to a predefined length, and compiling the determined bytecode trace into machine code.

If the interpreter is executing bytecode, the method may repeat.

In another aspect, there is provided a terminal having stored therein one or more virtual machines to be executed, the terminal including an interpreter configured to execute bytecode of the one or more virtual machines, a code generator configured to collect tracking information indicating a logical flow of bytecode of a virtual machine currently being executed by the interpreter, and to determine a bytecode trace that is to be executed by the interpreter based on the tracking information, and a compiler configured to execute the bytecode trace to generate machine code.

In response to determining that the compiler is in an idle state, the code generator may transmit the bytecode trace to the compiler, and in response to determining that the compiler is not in an idle state, the code generator may not transmit the bytecode trace to the compiler.

The tracking information may comprise a logical order for executing the bytecode and the number of executions of the bytecode, and the code generator may determines the start of the bytecode trace to be a line of bytecode that is executed more times than a threshold value.

The threshold value may be adjusted based on the status of the terminal and on the capacity of a work queue that stores machine code that is generated by executing the bytecode.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
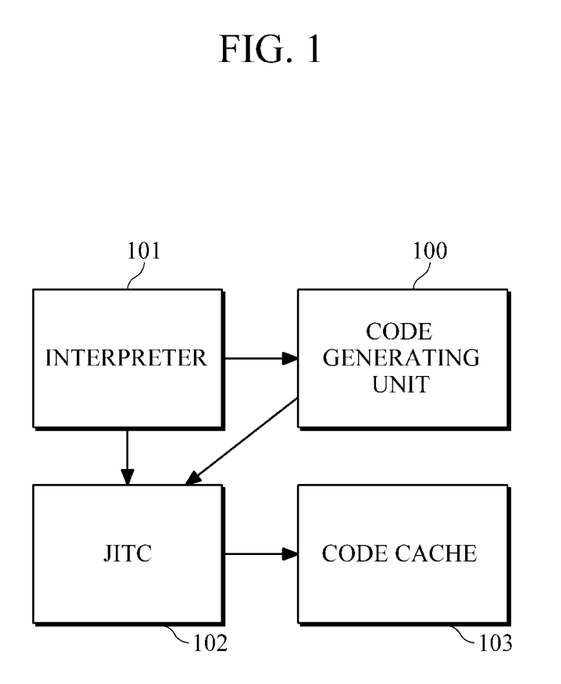
FIG. 1 is a diagram illustrating an example of a virtual machine that includes a code generating unit for generating extra code.

FIG. 1 illustrates an example of a virtual machine that includes a code generating unit for generating extra code. For example, the virtual machine may be included in a terminal such as a mobile terminal, a smart phone, a computer, a tablet, a home appliance, a sensor, and the like.

Referring to FIG. 1, a virtual machine (VM) includes an interpreter 101, a just-in-time complier (JITC) 102, a code cache 103, and a code generating unit 100.

The interpreter 101 may execute bytecode that is distributed as execution code of the VM. The JITC 102 may generate (i.e. compile) machine code for bytecode that is currently being executed, and the code cache 103 may store the generated machine code. When it is determined to re-execute the bytecode corresponding to a compiled segment, the VM may utilize the generated machine code that corresponds to the segment of the bytecode. For example, in response to determining to compile a specific segment of bytecode that is iteratively executed, the VM may determine the specific segment of bytecode as a bytecode trace and compile the determined bytecode trace into machine code.

The code generating unit 100 may collect tracking information that indicates a logical flow by which a bytecode is executed by the interpreter 102. In addition, the code generating unit 100 may determine a bytecode trace that is to be compiled into machine code by the JITC 102 using the tracking information.

In a case in which the VM including the interpreter 101, the JITC 102, the code cache 103, and the code generating unit 100 for generating extra code are running on a multi-core system, for example, the interpreter 101 and the JITC 102 may be allocated to different cores and executed. In this example, the JITC 102 may remain in a standby state in which the JITC 102 does not operate until the bytecode trace to be compiled by the interpreter 101 is transmitted to the JITC 102. Thus, the core allocated the JITC 102 may stay in an idle state.

In response to the JITC 102 in an idle state, the code generating unit 100 may transmit the determined bytecode trace to the JITC 102 to compile into machine code, and thereby run the idle core corresponding to the JITC 102 instead of letting the core sit idle.

Figure 2:
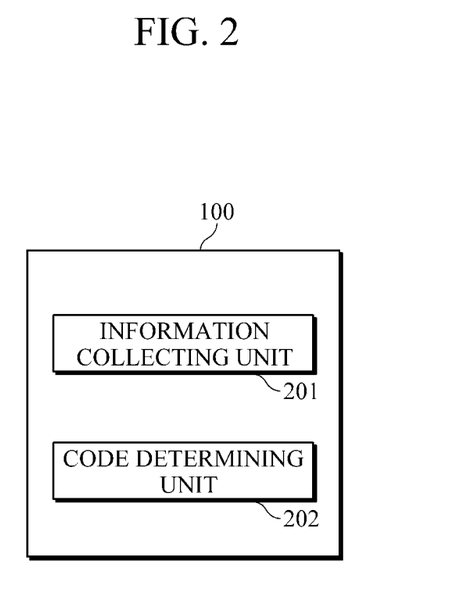
FIG. 2 is a diagram illustrating an example of the code generating unit for generating extra code shown in the example illustrated in FIG. 1.

FIG. 2 illustrates an example of the code generating unit for generating extra code shown in FIG. 1. Referring to FIG. 2, the code generating unit 100 includes an information collecting unit 201 and a code determining unit 202.

The information collecting unit 201 may collect tracking information that indicates a logical flow by which bytecode is executed by an interpreter.

The information collecting unit 201 may obtain the tracking information that includes a logical order for executing the bytecode, and the number of executions of bytecode by tracking a path of the bytecode that is executed by the interpreter.

The code determining unit 202 may determine a bytecode trace for which machine code is to be generated using the tracking information that is collected by the information collecting unit 201. For example, using the number of executions of bytecode that are included in the tracking information, a bytecode trace may be defined as a segment that starts from a line of bytecode that is executed more times than a threshold value. The bytecode trace may be a segment of code that starts at the line of bytecode that is executed more than a threshold value and segment may extend a predefined length of code.

The code determining unit 202 may divide bytecode into segments of predefined length based on the logical order for executing bytecode which is included in the tracking information. The code determining unit 202 may compile a segment of bytecode into machine code in consideration of the number of executions of the segment of bytecode. The code determining unit 202 may determine a bytecode trace to be the segment of bytecode that is determined as effective to system processing speed.

The code generating unit 100 may transmit the bytecode trace determined by the code determining unit 202 while the JITC is in a standby state, and the transmitted bytecode trace is compiled into machine code at just-in-time compile.

Figure 3:
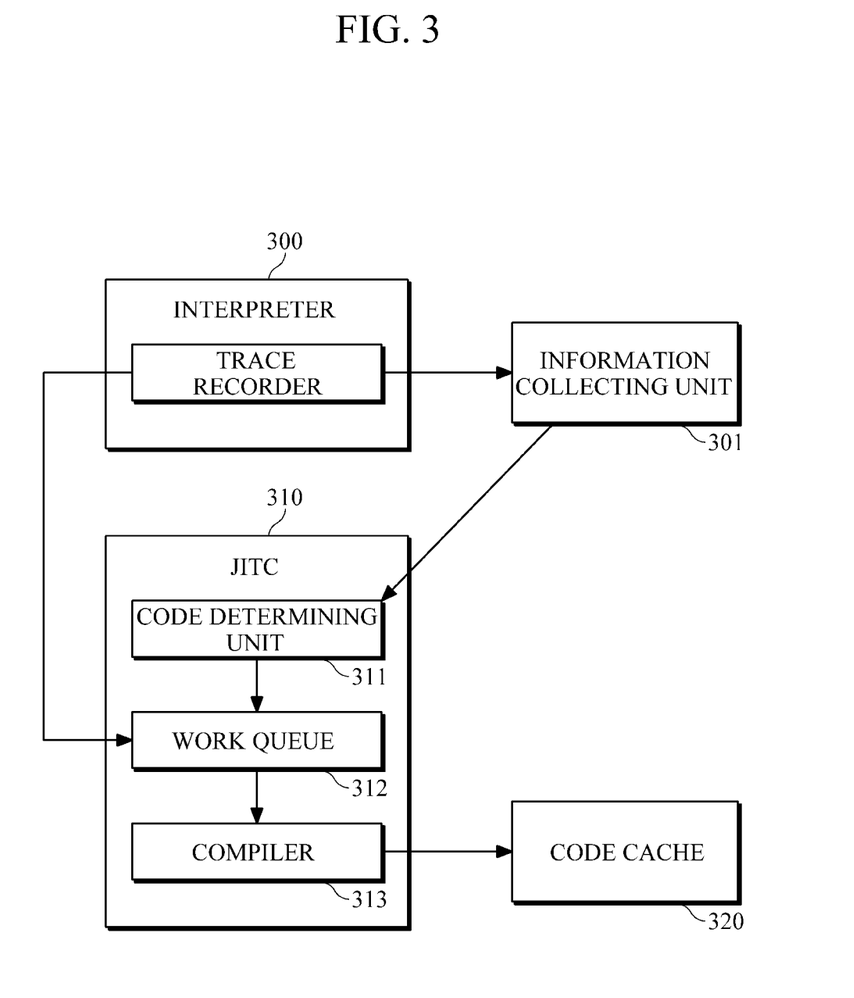
FIG. 3 is a diagram illustrating another example of a virtual machine that includes a code generating unit for generating extra code.

FIG. 3 illustrates another example of a virtual machine that includes a code generating unit for generating extra code. An example of the operation of the code generating unit for generating extra code is described with reference to FIG. 3.

Referring to FIG. 3, the operation of the code generating unit for generating extra code is executed between an interpreter 300 on a core that is different from that of the code generating unit, a just-in-time-compiler (JITC) 310, and a code cache 320.

The code generating unit shown in the example illustrated in FIG. 3 includes an information collecting unit 301 and a code determining unit 311. As an example, the information collecting unit 301 may be implemented exterior to the interpreter 300, and the code determining unit 311 may implemented inside the JITC 310.

The interpreter 300 may select a bytecode trace for machine code to be generated and store the bytecode in a trace recorder that is inside the interpreter 300 while executing bytecode. In this example, the bytecode trace stored in the trace recorder may be transmitted and stored in a work queue 312 of the JITC 310. The bytecode trace stored in the work queue 312 may be compiled into machine code by a compiler 313 of the JITC 310, and the machine code may be stored in the code cache 320.

If the machine code stored in the code cache 320 is to be executed, the machine code may be returned to the interpreter 300 and executed. While the interpreter 300 is executing the bytecode, the information collecting unit 301 may search a path of the bytecode currently being executed to collect tracking information that indicates a logical flow by which the bytecode is executed by the interpreter 300. In this example, by tracking the path of the bytecode executed by the interpreter, the information collecting unit 301 may obtain tracking information that includes, for example, the logical order for executing the bytecode, and the number of executions of the bytecode.

The code determining unit 311 may use the number of executions of the bytecode included in the tracking information that is collected by the information collecting unit 301 to define a starting point of a bytecode trace as a line of bytecode that is executed more times than a threshold value by the interpreter 300. The code determining unit 311 may determine a bytecode trace of a segment of the bytecode that starts from the starting point and that has a predefined length.

For example, the threshold value and the predefined length may be defined by taking into consideration the system status in which the virtual machine is running and/or the capacities of the work queue 312 and the code cache 320.

The code determining unit 311 may determine the bytecode trace in a similar manner as the bytecode trace that is selected while the interpreter 300 is executing the bytecode. However, as an example, the code determining unit 311 may not determine the bytecode trace by directly executing the bytecode, but may determine the bytecode trace by searching a path and analyzing OP code of the bytecode that results from the interpreter 300 executing the bytecode.

The bytecode trace determined by the code determining unit 311 may be stored in the work queue 312 as well as the bytecode trace selected by the interpreter 300, and may be compiled into machine code by the compiler 313 of the JITC 310. The machine code that is compiled from the bytecode trace that is determined by the code determining unit 311 may be stored in the code cache 320. If the interpreter 300 executes the bytecode corresponding to the stored machine code, the interpreter 300 may receive the machine code from the code cache 320 and may execute the machine code instead of the bytecode.

However, the code determining unit 311 may determine a bytecode trace and may transmit the bytecode trace to the work queue 312 when the JITC 310 is in a standby state, that is, when a core to which the JITC 310 is allocated is in an idle state.

In a case in which both the interpreter 300 and the JITC 310 are in operation, because a bytecode trace may be constantly selected by the interpreter 300, the JITC 310 is likely to constantly remain in operation.

While the JITC 310 is operating, the code determining unit 311 which determines the bytecode trace and transmits it to the JITC 310 may increase the load on the JITC 310, and consequently harm the performance of the multi-core system in which the virtual machine is running.

Figure 4:
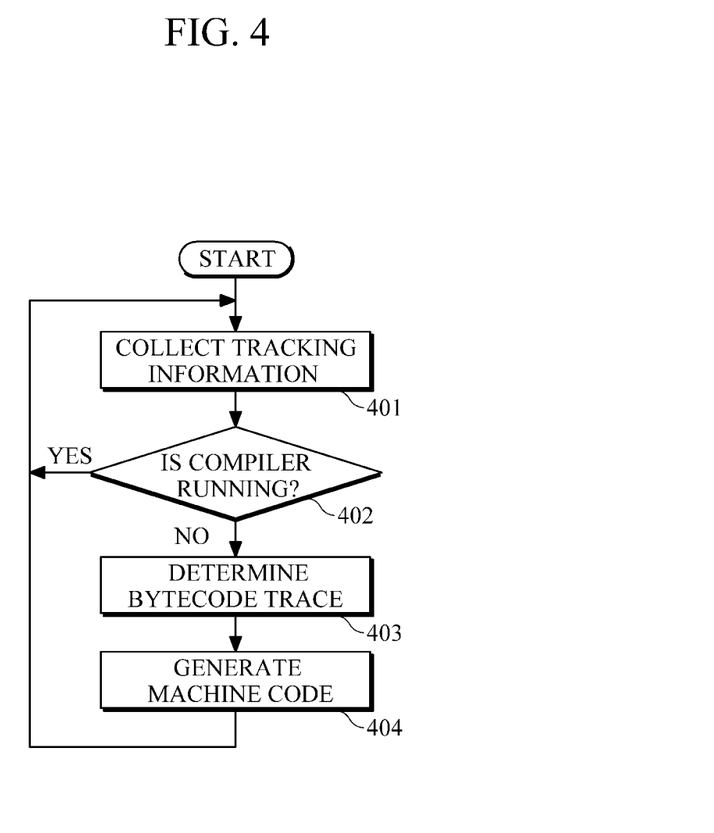
FIG. 4 is a flowchart illustrating an example of a method of generating extra code using the code generating unit shown in the example illustrated in FIG. 1.

FIG. 4 illustrates an example of a method of generating extra code using the code generating unit shown in the example illustrated in FIG. 1.

Referring to FIG. 4, the code generating unit for generating extra code collects tracking information from an interpreter that is executing bytecode (401).

For example, while the interpreter is executing the bytecode, the code generating unit may collect the tracking information that indicates a logical flow by which the bytecode is executed, by searching a path of the bytecode. The tracking information obtained by the code generating unit may include a logical order for executing the bytecode and the number of executions of the bytecode.

The code generating unit checks whether or not a JITC compiles a bytecode trace into machine code (402). That is, the code generating unit checks whether the JITC is in operation or not in operation.

If the JITC is in a standby state in which the JITC is not in operation, the code generating unit determines a bytecode trace to be generated into machine code based on the collected tracking information (403). For example, the code generating unit may divide the bytecode into segments of a predefined length based on a logical order for executing bytecode which is included in tracking information, compile a segment of bytecode into machine code in consideration of the number of executions of the trace of bytecode, and determine a bytecode trace to be the segment of bytecode that is determined as effective to system processing speed.

Then, the bytecode trace determined by the code generating unit is generated (compiled) into machine code by a JITC (404).

In a case in which the JITC is in operation 402 or in a case in which the bytecode trace determined by the code generating unit has been completely compiled into machine code (404), the procedure may return to operation 401 and be performed iteratively.

In operation 401 for collecting tracking information, a path of bytecode currently being executed by the interpreter may be searched to collect the tracking information that indicates a logical flow by which the bytecode is executed. For example, the tracking information may include the number of executions of the bytecode by the interpreter, and in operation 403, a bytecode trace may be determined to be a trace of bytecode that starts from a line of the bytecode that is executed more times than a threshold value and that ends at a predefined length, based on the number of executions of the bytecode that is included in the tracking information.

In this example, the threshold value and the predefined length may be defined in consideration of the system status in which the virtual machine is running.

Figure 5:
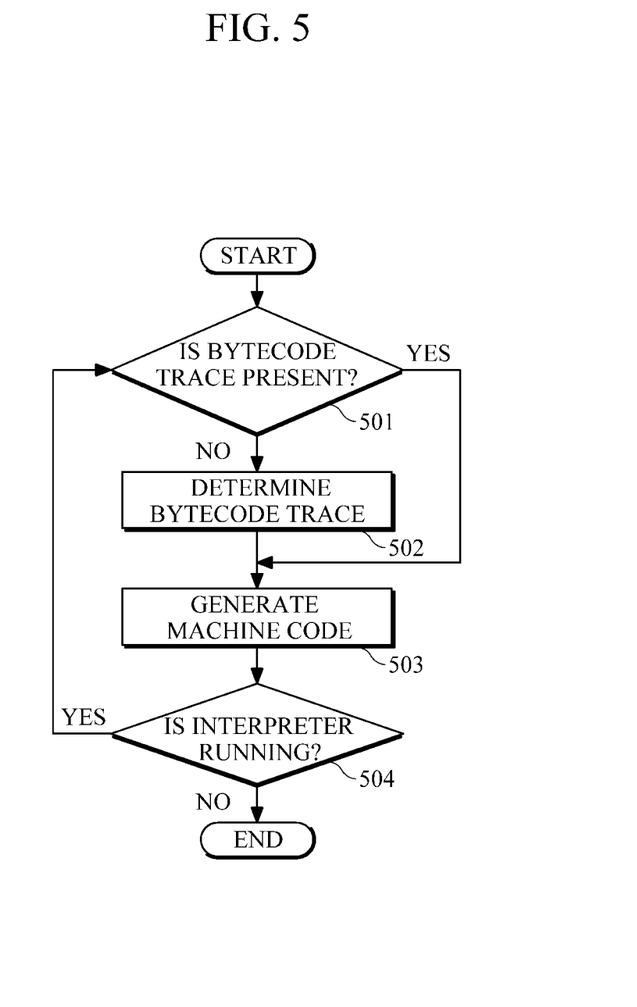
FIG. 5 is a flowchart illustrating an example of a method of generating extra code using the code generating unit shown in the example illustrated in FIG. 3.

FIG. 5 illustrates an example of a method of generating extra code using the code generating unit shown in the example illustrated in FIG. 3.

Referring to FIGS. 3 and 5, the code generating unit checks whether a bytecode trace generated by an interpreter is present or not (501). For example, the presence of bytecode trace may be determined by checking whether or not a bytecode group is stored in a trace recorder of the interpreter or a work queue of JITC.

In response to determining that the bytecode trace generated by the interpreter is not present, the group generating unit 311 of the code generating unit determines the bytecode trace using tracking information collected by the information collecting unit 301 of the apparatus (502). The tracking information collected by the information collecting unit 301 which indicates a logical flow by which the bytecode is executed by the interpreter may include the number of executions of the bytecode.

The code determining unit 311 may use the number of executions of the bytecode that is included in the tracking information collected by the information collecting unit 301 to define a starting point of the bytecode traces. For example, the starting point may be a line of bytecode that is executed more times than a threshold value by the interpreter. Accordingly, the code determining unit 311 may determine a trace from the starting point to a predefined length as the bytecode trace. For example, the threshold value and the predefined length may be defined in consideration of a system status in which the virtual machine is running, and capacities of the work queue 312 and the code cache 320.

The bytecode trace determined by the apparatus is generated (compiled) into machine code by the compiler 313 of the JITC 310 (503).

Afterwards, in a case in which the interpreter is executing bytecode, that is, in a case in which the interpreter remains in operation (504), the code generating unit repeats procedures from operation 501 in which the presence of the bytecode trace selected by the interpreter is determined.

However, in a case in which the interpreter is not executing the bytecode, that is, in a case in which the interpreter is not in operation (504), the operation of the JITC ends, and the operation of the apparatus ends as well.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating code for a virtual machine, the apparatus comprising:
 a processor;
 an interpreter implemented by the processor and configured to execute bytecode of a virtual machine;
 an information collecting unit implemented by the processor and configured to collect tracking information indicating a logical flow of execution of the bytecode by the interpreter, and to collect a number of executions of the bytecode by the interpreter; and
 a compiler implemented by the processor, the compiler configured to compile the bytecode into machine code, the compiler comprising:
 a work queue configured to store bytecode sections to be translated into machine code; and
 a code determining unit configured to receive the collected tracking information and to determine whether the compiler is idle, wherein
 in response to the compiler being idle, divide the bytecode into bytecode segments having a predefined length, based on the logical flow of execution of the bytecode;

determine a bytecode trace among the bytecode segments, based on the number of executions of the bytecode, wherein the bytecode trace has the predefined length, and wherein the bytecode trace comprises a starting point that is a bytecode segment that has been executed by the interpreter more than a threshold number of executions; and compile the bytecode into machine code:

and in response to the compiler not being idle, receive the collected tracking information, wherein the information collecting unit is implemented separately from both the interpreter and the compiler, and wherein the predefined length of the bytecode trace is defined based on a capacity of the work queue and a capacity of a code cache.

2. The apparatus of claim 1, wherein the compiler runs on a core of the processor that is different from a core of the processor on which the interpreter that executes the bytecode runs.

3. The apparatus of claim 1, wherein the information collecting unit is further configured to search a path of the bytecode that is currently being executed by the interpreter, and to collect the tracking information based on the searched path.

4. The apparatus of claim 1, wherein the interpreter and the code determining unit run on different cores of the processor, and the code determining unit is configured to determine the bytecode trace while the compiler is in an idle state.

5. The apparatus of claim 1, wherein the code cache stores the machine code that is compiled from the bytecode executed by the interpreter or the machine code that is compiled from the bytecode trace determined by the code determining unit.

6. A method of generating code for a virtual machine, the method comprising:

executing bytecode at an interpreter implemented by a processor;

collecting tracking information at an information collecting unit, wherein the tracking information indicates a logical flow of execution of the bytecode by the interpreter, and a number of executions of the bytecode by the interpreter, and wherein the information collecting unit is implemented separately from both the interpreter and a compiler implemented by the processor;

determining whether the compiler is idle, in response to the compiler being idle dividing the bytecode into bytecode segments having a predefined length, based on the logical flow of execution of the bytecode; and determining a bytecode trace among the bytecode segments, based on the number of executions of the bytecode, the bytecode trace having the predefined length, wherein the bytecode trace comprises a starting point that is a bytecode segment that has been executed by the interpreter more than a threshold number of executions;

in response to the compiler not being idle, collecting tracking information at an information collecting unit;

storing the bytecode trace in a work queue; and transmitting the stored bytecode trace to the compiler, in order to be compiled into machine code, and defining the predefined length of the bytecode trace based on a capacity of the work queue of the compiler and a capacity of a code cache configured to store machine code compiled from the bytecode executed by the interpreter.

7. The method of claim 6, wherein the collecting of the tracking information comprises:

searching a path of the bytecode that is currently being executed by the interpreter, and collecting the tracking information based on the searched path.

8. A method of generating code for a virtual machine comprising bytecode, the method comprising:

receiving tracking information at an information collecting unit implemented in a processor, that indicates a logical flow by which bytecode is executed by an interpreter wherein the information collecting unit is implemented separately from both the interpreter and a compiler implemented by the processor;

determining whether the compiler is idle, in response to the compiler being idle dividing the bytecode into bytecode segments having a predefined length, based on the logical flow of execution of the bytecode;

checking, at a code determining unit, whether the interpreter has determined a bytecode trace, and in response to the bytecode trace not being determined by the interpreter, determining, by the code determining unit, a new bytecode trace among the bytecode segments, based on the number of executions of the bytecode, and storing the new bytecode trace in a work queue; and in response to the compiler not being idle, receiving tracking information at an information collecting unit;

compiling into machine code, at the compiler, when the compiler exits a standby state, the new bytecode trace determined by the code determining unit and stored in a work queue; and defining the predefined length of the new bytecode trace based on a capacity of the work queue of the compiler and a capacity of a code cache configured to store machine code compiled from the bytecode executed by the interpreter, wherein the new bytecode trace is a segment of code having the predefined length beginning at a starting point, and the starting point is a bytecode segment that has been executed by the interpreter more than a threshold number of executions.

9. The method of claim 8, wherein the method is repeated as long as the interpreter is executing the bytecode.

10. A terminal, the terminal comprising:

a processor;

an interpreter implemented by the processor and configured to execute bytecode of a virtual machine, and determine a bytecode trace, to determine machine code to be generated;

an information collecting unit implemented in the processor and configured to collect tracking information indicating a logical flow of the bytecode currently being executed by the interpreter, collect a number of executions of the bytecode by the interpreter;

determining whether a compiler implemented by the processor is idle, wherein in response to the compiler being idle a code generator implemented by the processor, and configured to divide the bytecode into bytecode segments having a predefined length, based on the logical flow of execution of the bytecode;

check whether the interpreter has determined the bytecode trace, and in response to the bytecode trace not being determined by the interpreter, determine a new bytecode trace among the bytecode segments, based on the number of executions of the bytecode, wherein the new bytecode trace is a segment of code having the predefined length beginning at a starting point, the starting point being a bytecode segment that has been executed by the interpreter more than a threshold number of executions; and in response to the compiler not being idle, collect tracking information;

wherein the compiler is configured to compile the new bytecode trace into machine code, and the compiler includes a work queue configured to store bytecode sections to be translated into machine code, wherein the information collecting unit is implemented separately from both the interpreter and the compiler, and wherein the predefined length of the new bytecode trace is defined based on a capacity of the work queue and a capacity of a code cache configured to store machine code compiled from the bytecode executed by the interpreter.

11. The terminal of claim 10, wherein the threshold number is adjusted, based on the status of the terminal and on a capacity of the work queue that stores machine code that is generated by the compiler.

12. The method of claim 6, wherein the executing bytecode at an interpreter and the determining the bytecode trace are run on different cores of the processor, and the determining is performed while the compiler is in an idle state.

13. The method of claim 8, wherein the interpreter and the code determining unit run on different cores of the processor, and the code determining unit is configured to determine the bytecode trace while the compiler is in an idle state.

14. The terminal of claim 10, wherein the interpreter and the code generator run on different cores of the processor, and the code generator is configured to determine the new bytecode trace while the compiler is in an idle state.

* * * * *